US 6,651,927 B1

(12) United States Patent
Hackett et al.

(10) Patent No.: US 6,651,927 B1
(45) Date of Patent: Nov. 25, 2003

(54) AIRFOIL TRAILING EDGE

(75) Inventors: Kevin C Hackett, Bedford (GB); Patrick R Ashill, Bedford (GB); John E Green, Bedford (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/868,236

(22) PCT Filed: Oct. 15, 1999

(86) PCT No.: PCT/GB99/03434

§ 371 (c)(1),
(2), (4) Date: Jun. 15, 2001

(87) PCT Pub. No.: WO00/38984

PCT Pub. Date: Jul. 6, 2000

(30) Foreign Application Priority Data

Dec. 24, 1998 (GB) .............................. 9828447

(51) Int. Cl.⁷ ................................. B64C 3/14
(52) U.S. Cl. .................................... 244/35 R
(58) Field of Search ............... 244/35 R, 35 A, 244/34 R, 123

(56) References Cited

U.S. PATENT DOCUMENTS

| 1,802,283 | A | * | 4/1931 | Simmonds |
| 3,952,971 | A | | 4/1976 | Whitcomb |
| 4,413,796 | A | | 11/1983 | Bousquet |
| 4,455,003 | A | | 6/1984 | Hilbig |
| 4,459,083 | A | * | 7/1984 | Bingham |
| 4,524,928 | A | * | 6/1985 | Schmidt et al. |
| 4,718,619 | A | * | 1/1988 | Ashill et al. |
| 4,776,531 | A | * | 10/1988 | Noonan |
| 4,858,852 | A | | 8/1989 | Henne et al. |
| 5,318,249 | A | | 6/1994 | Stoner |
| 5,344,102 | A | * | 9/1994 | Nakadate et al. |
| 5,395,071 | A | * | 3/1995 | Felix |

FOREIGN PATENT DOCUMENTS

| GB | 1 406 826 | 9/1975 |
| GB | 1 554 713 | 10/1979 |
| GB | 2 072 600 | 10/1981 |
| WO | WO88/09745 | 12/1988 |
| WO | WO93/02915 | 2/1993 |

OTHER PUBLICATIONS

McCormick, Barnes. Aerodynamics, Aeronautics, and Flight Mechanics. 1979. John Wiley & Sons.*

* cited by examiner

*Primary Examiner*—Tien Dinh
(74) *Attorney, Agent, or Firm*—McDonnell Boehnen Hulbert & Berghoff

(57) ABSTRACT

An aerofoil wing comprising upper and lower surfaces meeting at the leading and trailing edges and a camber line representing the curvature of the aerofoil comprising at least two regions of substantially linear increases in curvature and wherein the increases in curvature are of monotonically increasing magnitude. Preferably there are three regions of substantially linear increases in curvature.

9 Claims, 20 Drawing Sheets

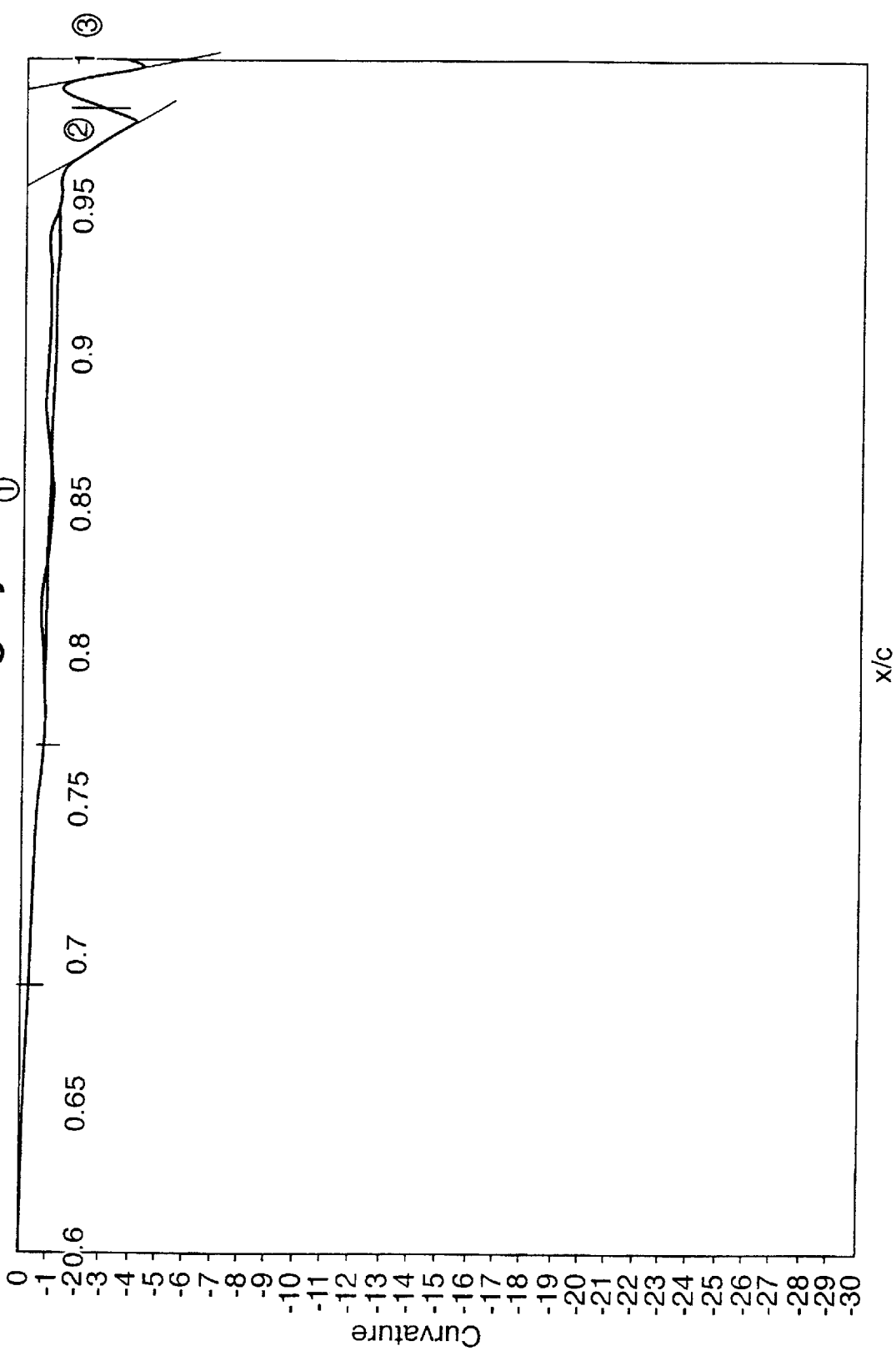

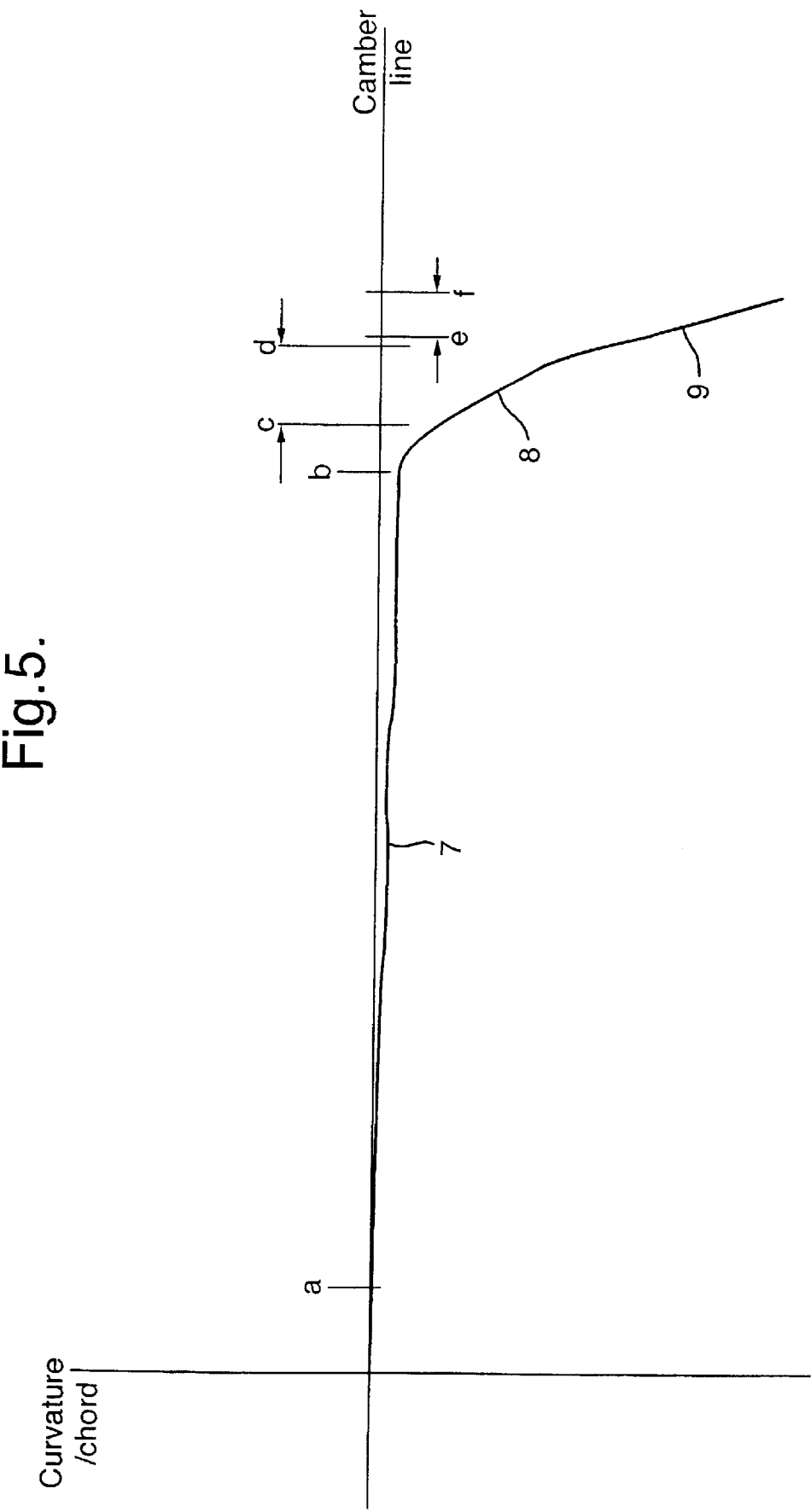

AIRFOIL TRAILING EDGE

BACKGROUND OF THE INVENTION

1. Field of the Invention

The invention relates to aerofoil sections and in particular to those designed to endure turbulent i.e. high Reynolds number air flows. It has particular application to large civil aircraft.

2. Discussion of Prior Art

It is an ever present desire to design aerofoils having improved drag characteristics which at the same time do not diminish lift characteristics to an undesirable level. The parasitic drag on an aircraft includes both viscous drag, resulting from the viscosity of the air, and pressure drag, resulting from an imbalance of pressure acting on the aircraft surfaces. At subsonic velocity the viscous drag is the predominant contributor to the parasitic drag of the aircraft. However, as the aircraft approaches Mach 1.0, local regions of supersonic flow develop on the surface of the aircraft. For local Mach numbers nearly equal to 1.0, the air is able to recompress (return to subsonic conditions) without forming local pressure jump discontinuities or shocks on the surface of the aircraft. U.S. Pat. No. 5,318,249 describes a transonic aerofoil in which the absolute value of the negative slope of the camber increases by at least about 50% over the aft 4% of the chord.

It is an object of the invention to provide an aerofoil with even further improved reduced drag characteristics than prior art aerofoils.

SUMMARY OF THE INVENTION

The inventors have determined that applying a pressure distribution on the upper surface of an aerofoil with a mild adverse pressure gradient recovery, followed by a rapid increase in pressure just short of the trailing edge, allows aerofoils to be designed which offer lower drag at high Reynolds numbers. The effect of this is to maximise lift to drag ratio by pushing the boundary layer as hard as possible i.e. close to separation. The inventors have defined a series of upper surface pressure distributions made up of regions of zero pressure gradient, regions of equilibrium, adverse gradient and jumps in pressure. By applying a simplified boundary-layer calculation to the upper surface pressure distributions the inventors have showed that improvements in lift to drag ratios are possible over prior art aerofoils. The inventors have also determined that there was a value of adverse pressure gradient parameter above which the flow would be sensitive to Reynolds number.

In accordance with the present invention an aerofoil wing comprises upper and lower surfaces meeting at the leading and trailing edges and a camber line representing the curvature of the aerofoil characterised in that the camber line comprises at least two regions of substantially linear increases in curvature; wherein in a first region the maximum deviation of linearity in curvature increase from a straight line over at least 20% of chord is 1/chord; wherein in a second region includes a curvature increase of at least 3/chord the maximum deviation of linearity in curvature increase is 1.5/chord from a straight line; and wherein the increases in curvature are of monotonically increasing magnitude.

BRIEF DESCRIPTION OF THE FIGURES

The invention will be described with reference to the following figures of which:

FIGS. 4a–j show various embodiments of the aerofoils according to the invention in terms of the curvature of camber.

FIG. 5 shows a generalised representation of the aerofoils of FIG. 4 in terms of camber curvature.

DETAILED DISCUSSION OF EMBODIMENTS

FIG. 11 compares the drag rise boundary for a conventional aerofoil and two aerofoils according to the invention.

Figure 1:
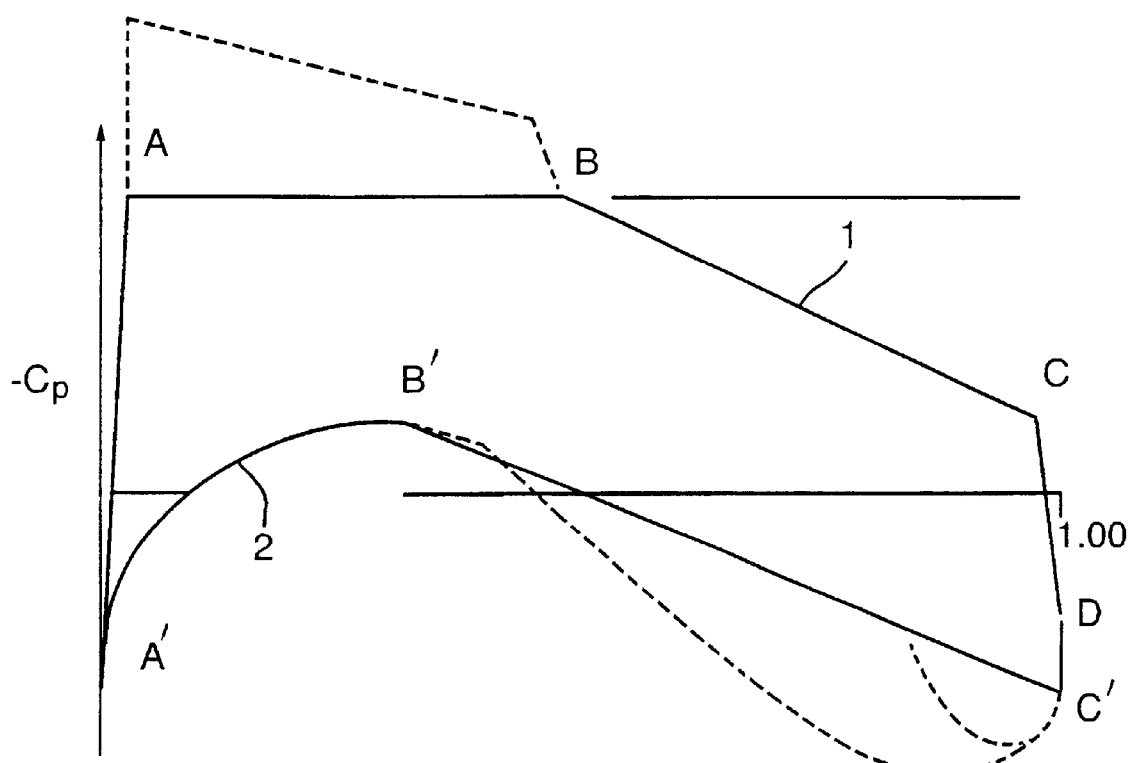
FIG. 1 shows a figure of the desired pressure distribution resulting from flow over an aerofoil according to the invention.

FIG. 1 shows the desired pressure distribution over an aerofoil as determined by the inventors in order to reduce drag at high Reynolds numbers. The upper aerofoil surface 1 pressure distribution consists of a "sonic" or flat roof top, AB, followed by a mild adverse pressure recovery, BC, which is terminated by a rapid pressure rise, CD. The shape of the aerofoil in the region of AB is constrained to some extent by the need for good supercritical flow development as indicated by the dashed line. The chordwise position of B can vary from 5% to 90% chord. The location of the start of the pressure rise C is at about 98.5% of chord. The rise in pressure coefficient at the rapid pressure jump, CD, has been varied from 0 up to 0.465; the magnitude is chosen to avoid a rapid rise in viscous drag. However for some particular applications it might be advantageous to allow for a higher value. The lower aerofoil surface 2 features a favourable pressure gradient A'B', followed by a mild adverse pressure recovery B'C', and terminated by a rapid acceleration C'D. The position of B' is determined by location of the maximum thickness of the aerofoil section. Variations on the lower surface design are also illustrated on the sketch, showing. a conventional rear loading and local rear loading. The purpose of the local rear loading is to reduce the aerofoil trailing edge angle in order to minimise the risk of increasing the viscous drag level. The rapid acceleration C'D, reduces the value of the boundary layer momentum thickness following the growth in the region of the lower surface pressure recovery.

Before the embodiments of the aerofoils according to the invention are described it is necessary to define some terms. The term "camber line" is the line defining the mid point between the upper and lower surfaces of the aerofoil extending from the leading to the trailing edge i.e. $z_{camber}$ (camber line)=$(z_{upper}+z_{lower})/2$ where z is the vertical location of the surface at a particular chord position.

The term slope A is defined as dz/dx; and the term curvature k is defined as dA/ds $(d^2z_{camber}/dx^2)/((1+(z_{camber}/dx)^2)$ where x is is the chordwise location made non-dimensional by chord length. A is the slope of the camber line at chordwise position x, and s is the distance along the camber line.

Figure 2A:
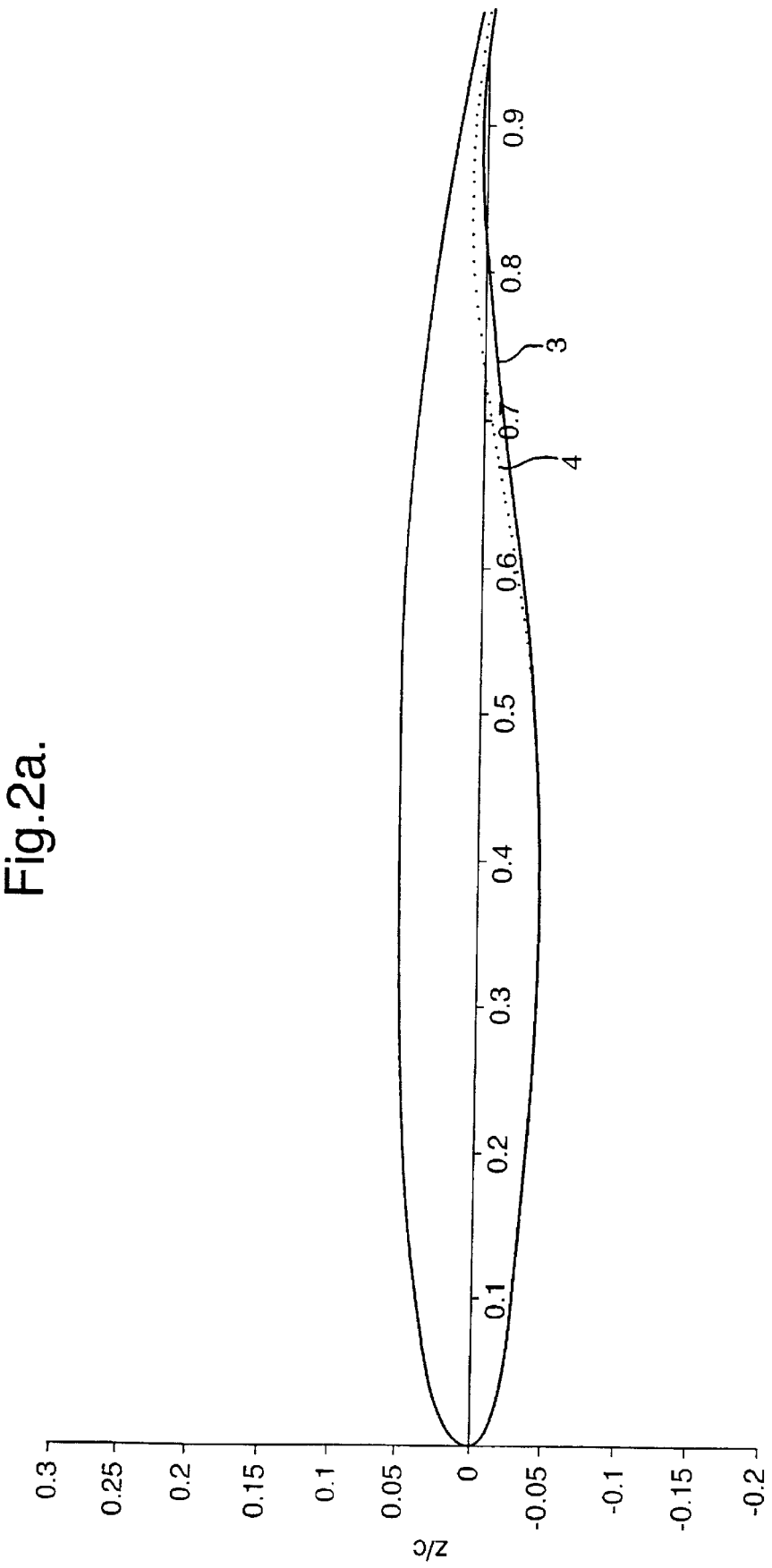
FIGS. 2a and 2b show a design of an aerofoil according to the invention in comparison with a conventional aerofoil.
Figure 2B:
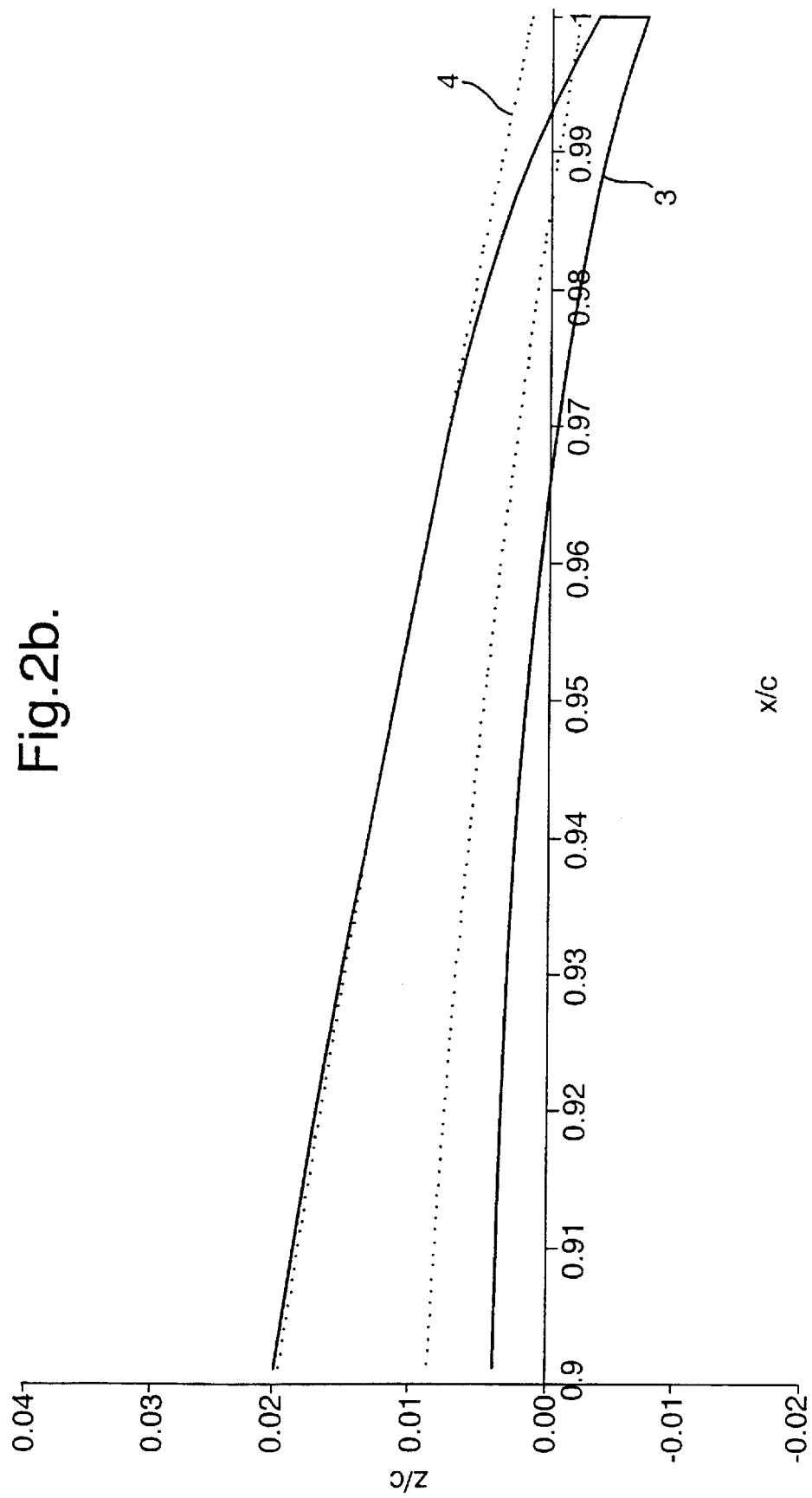

FIG. 2 a shows an example of an aerofoil according to the invention in comparison with a conventional aerofoil 4 shown in broken lines on the figure. FIG. 2b shows in more detail the aft portion of this aerofoil. The section of trailing edge of the novel aerofoil shows a substantial increase camber aft of 97% of chord. However in order to understand the invention it is more appropriate to describe the invention by looking at the slope of the camber.

Figure 3:
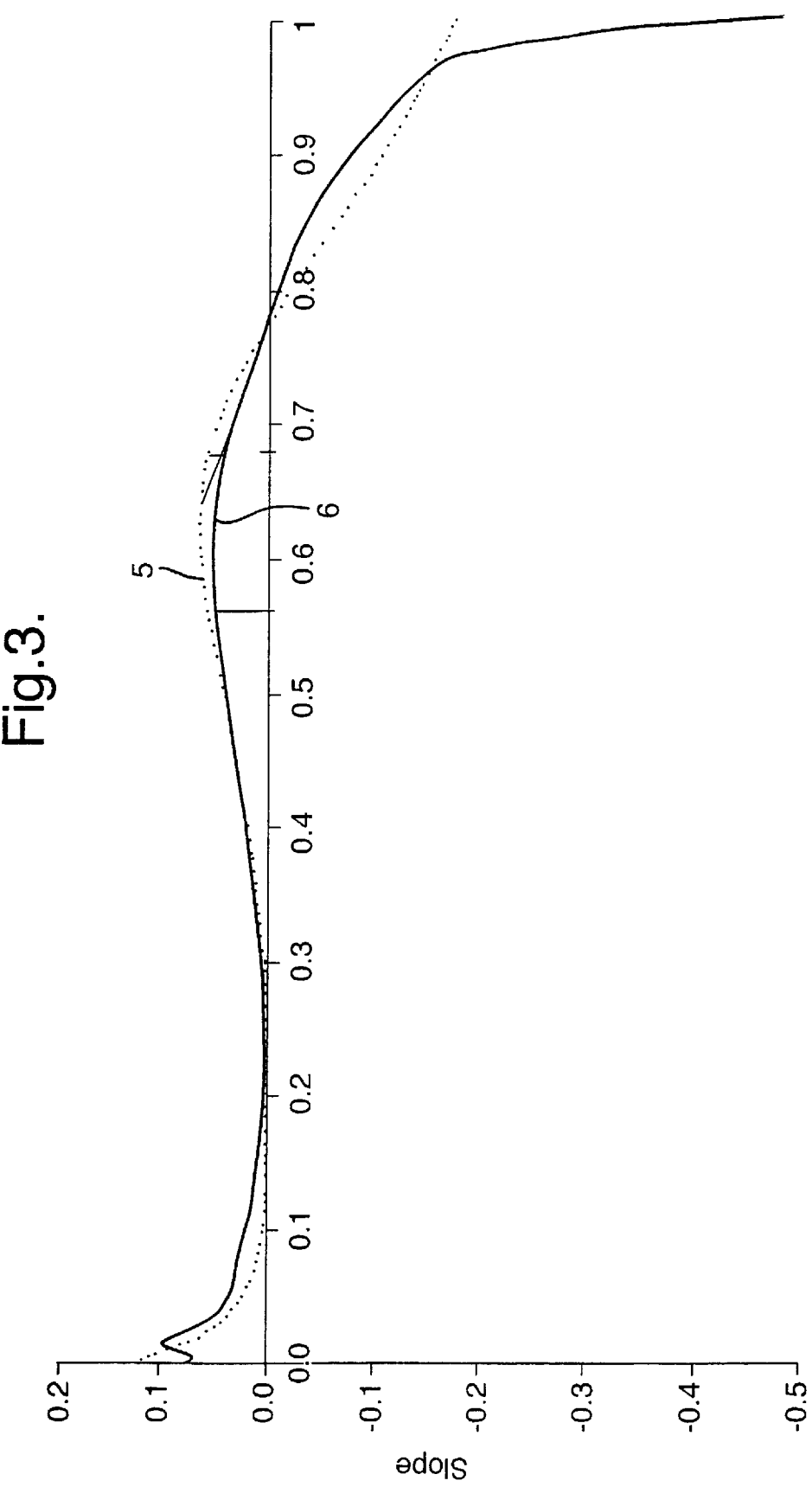
FIG. 3 shows a comparison of surface slope of a conventional aerofoil and one according to the invention.
Figure 4A:
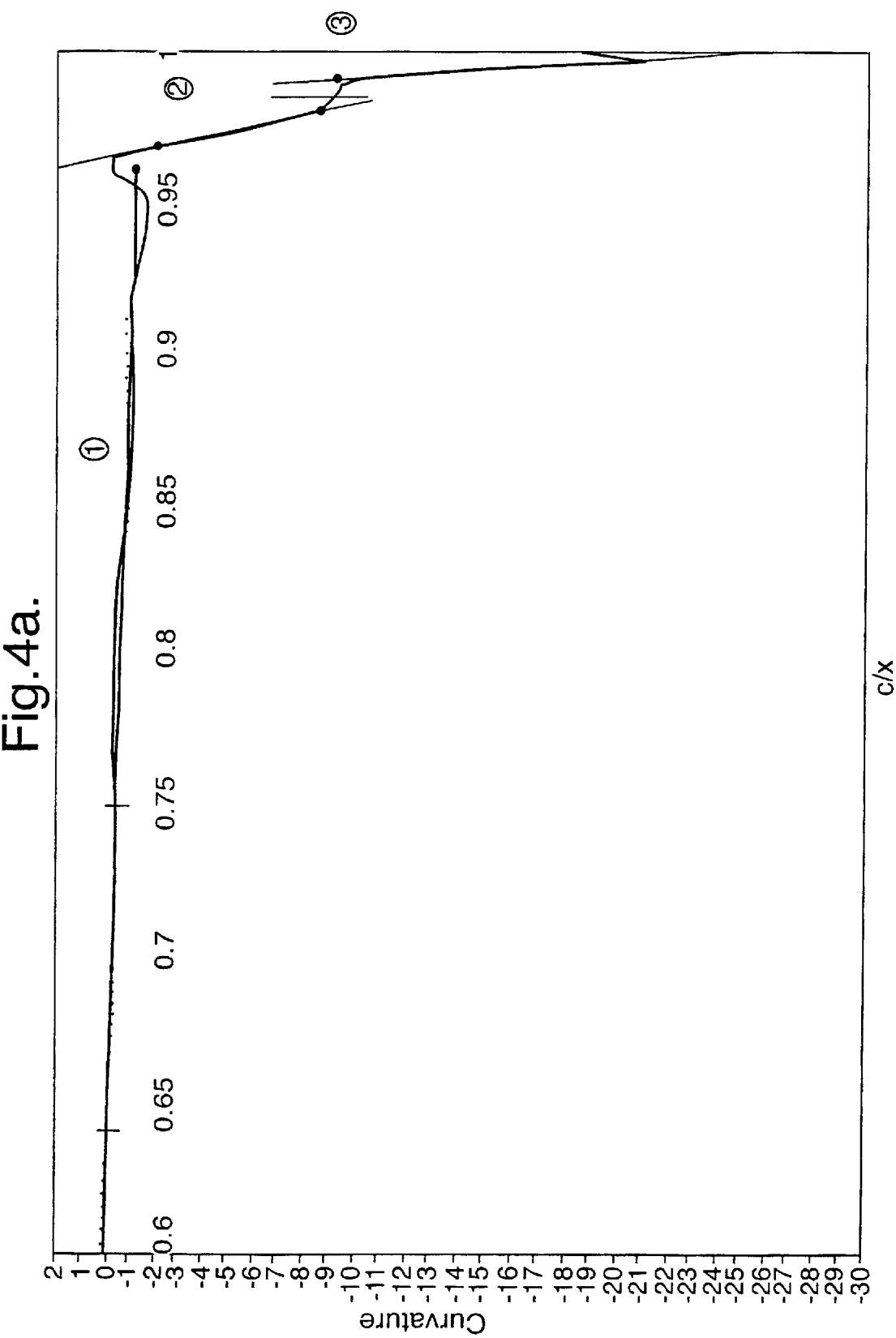
Figure 4B:
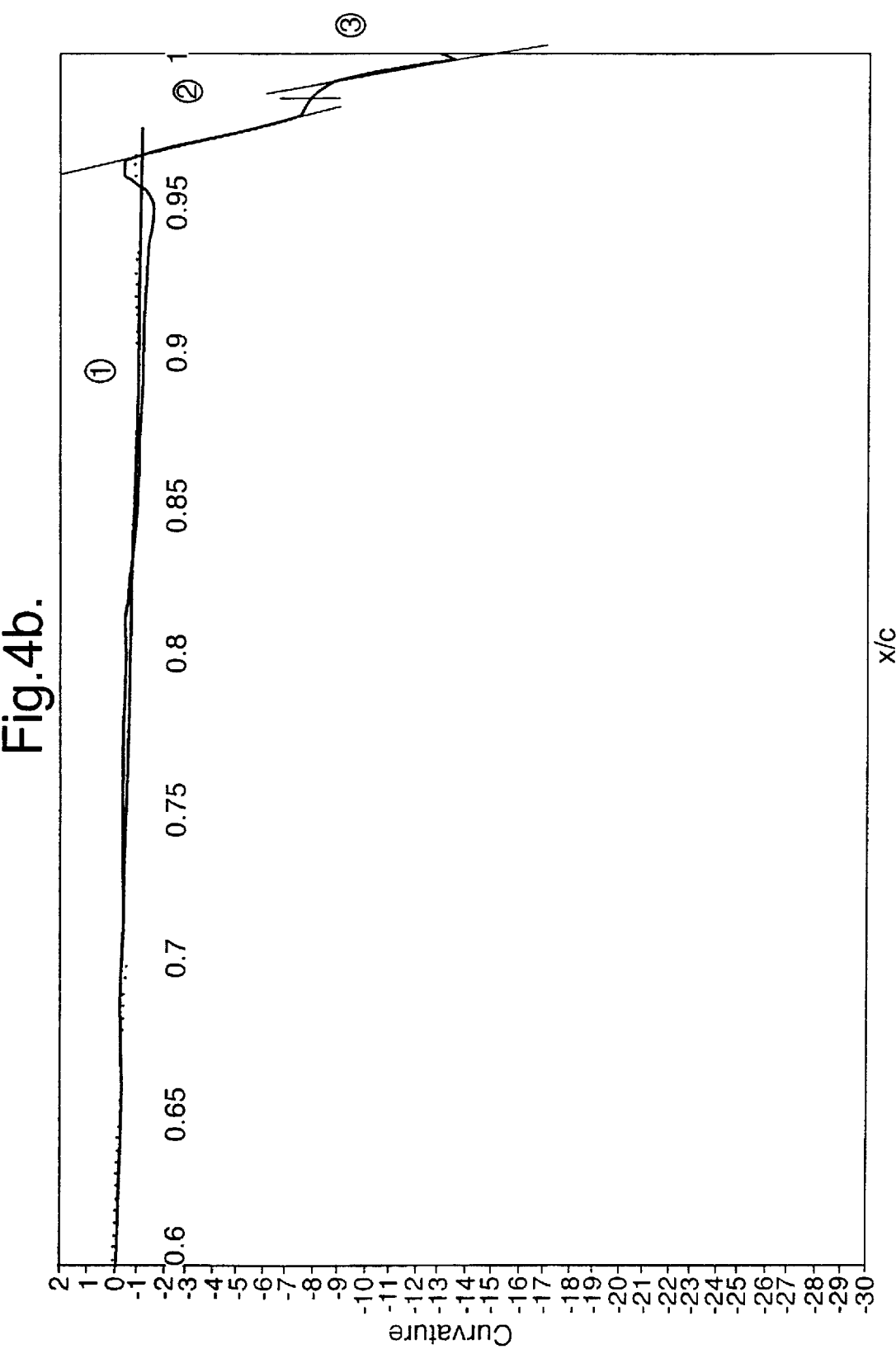
Figure 4C:
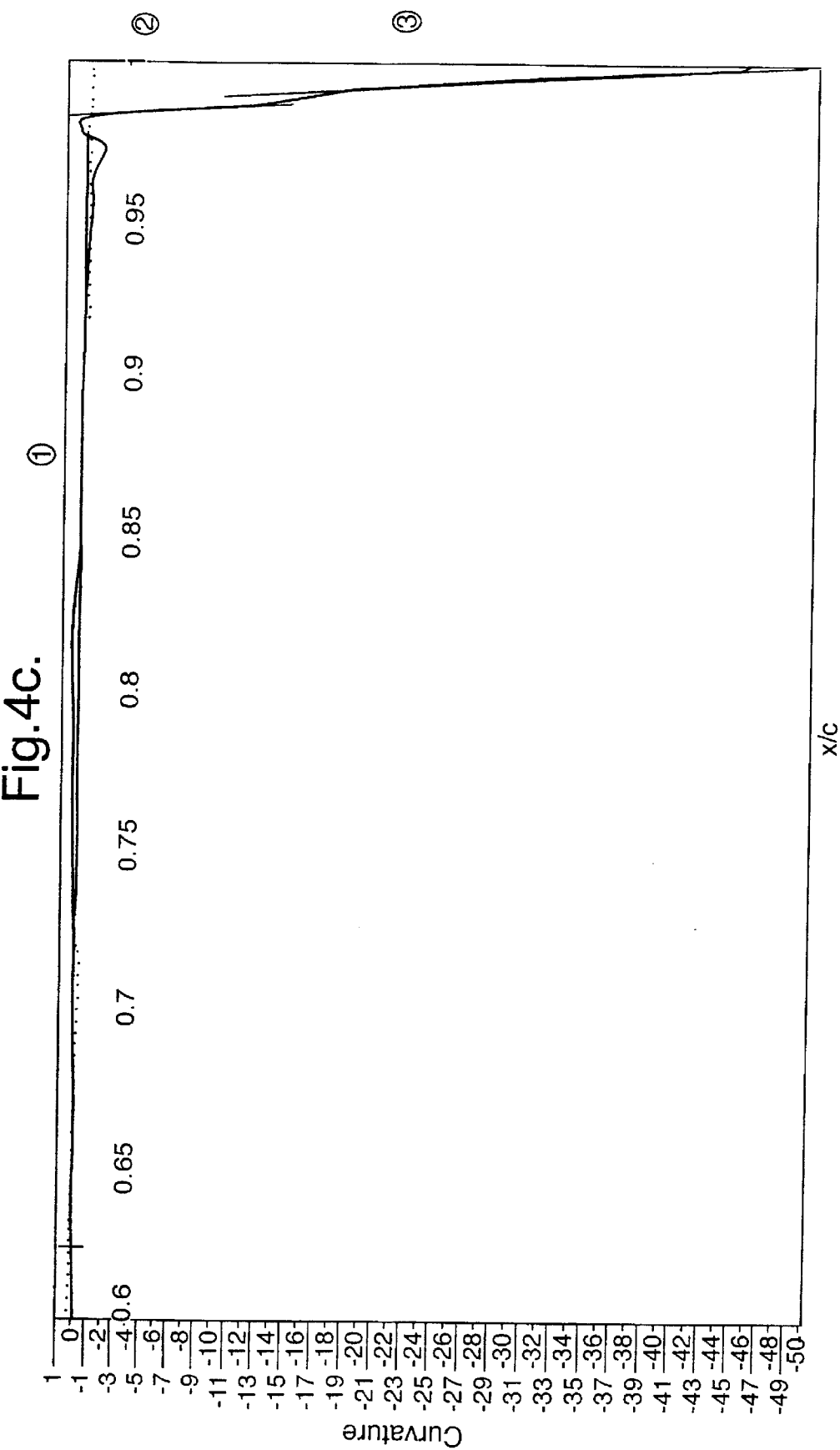
Figure 4D:
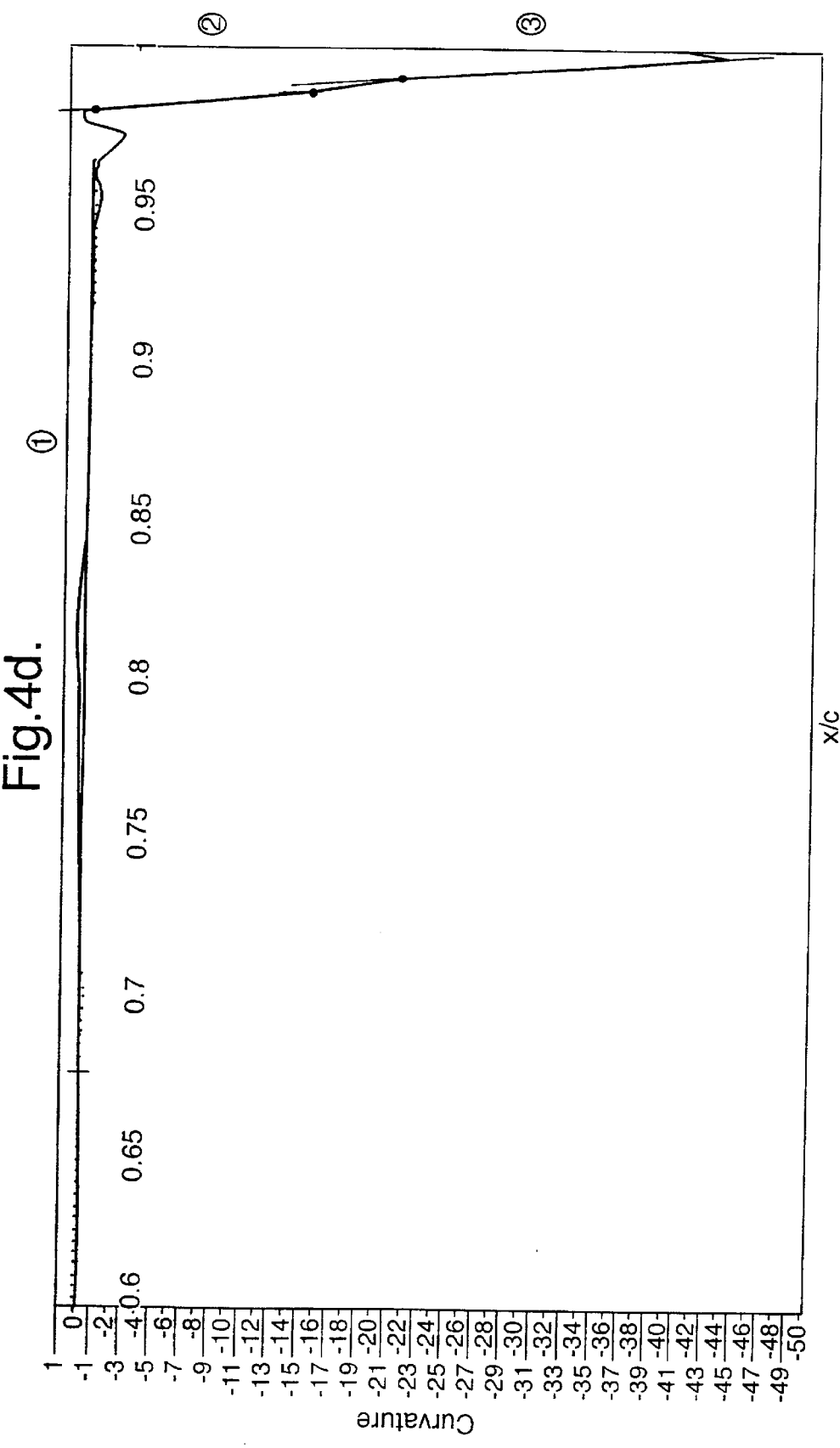
Figure 4E:
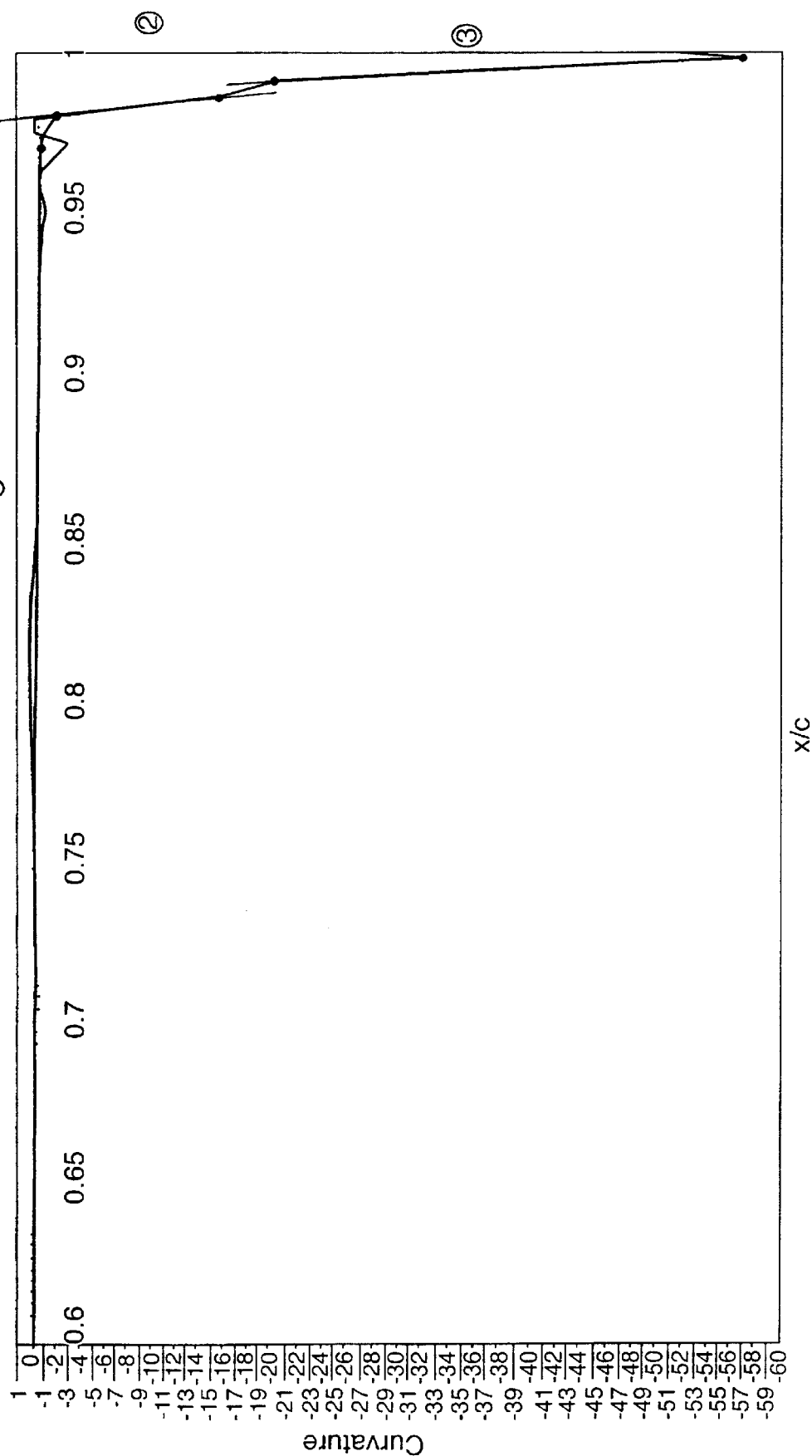
Figure 4F:
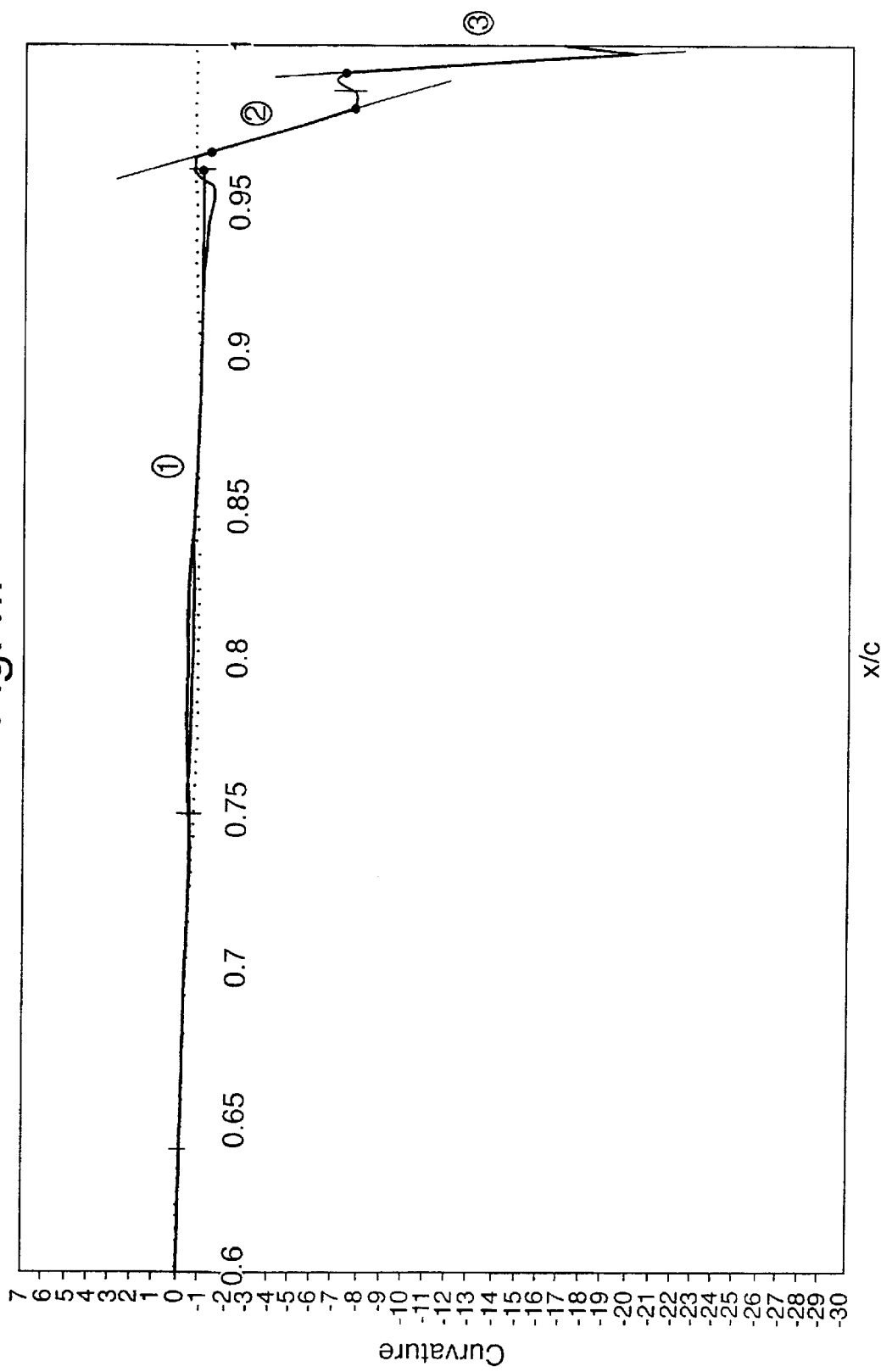
Figure 4G:
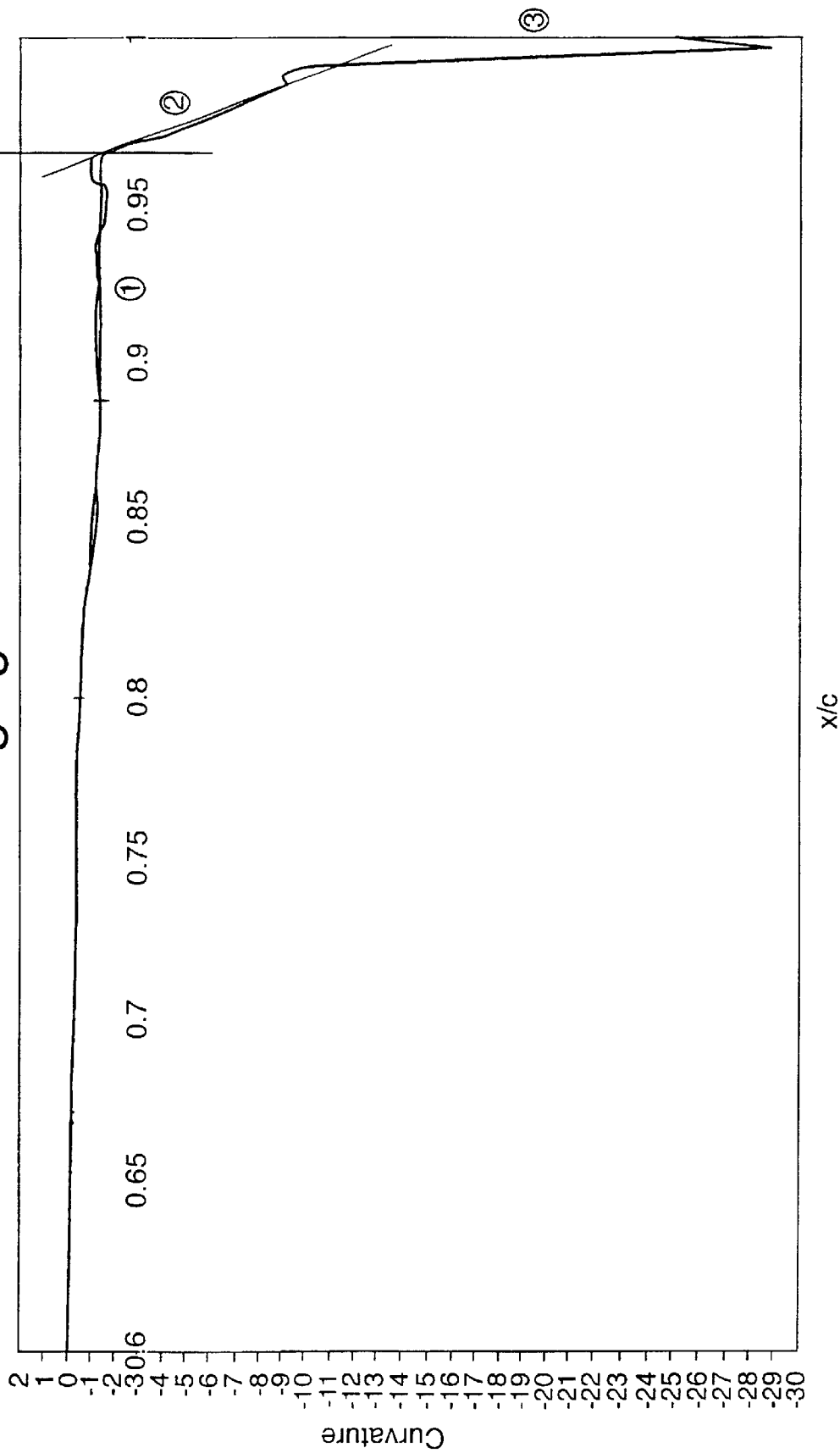
Figure 4H:
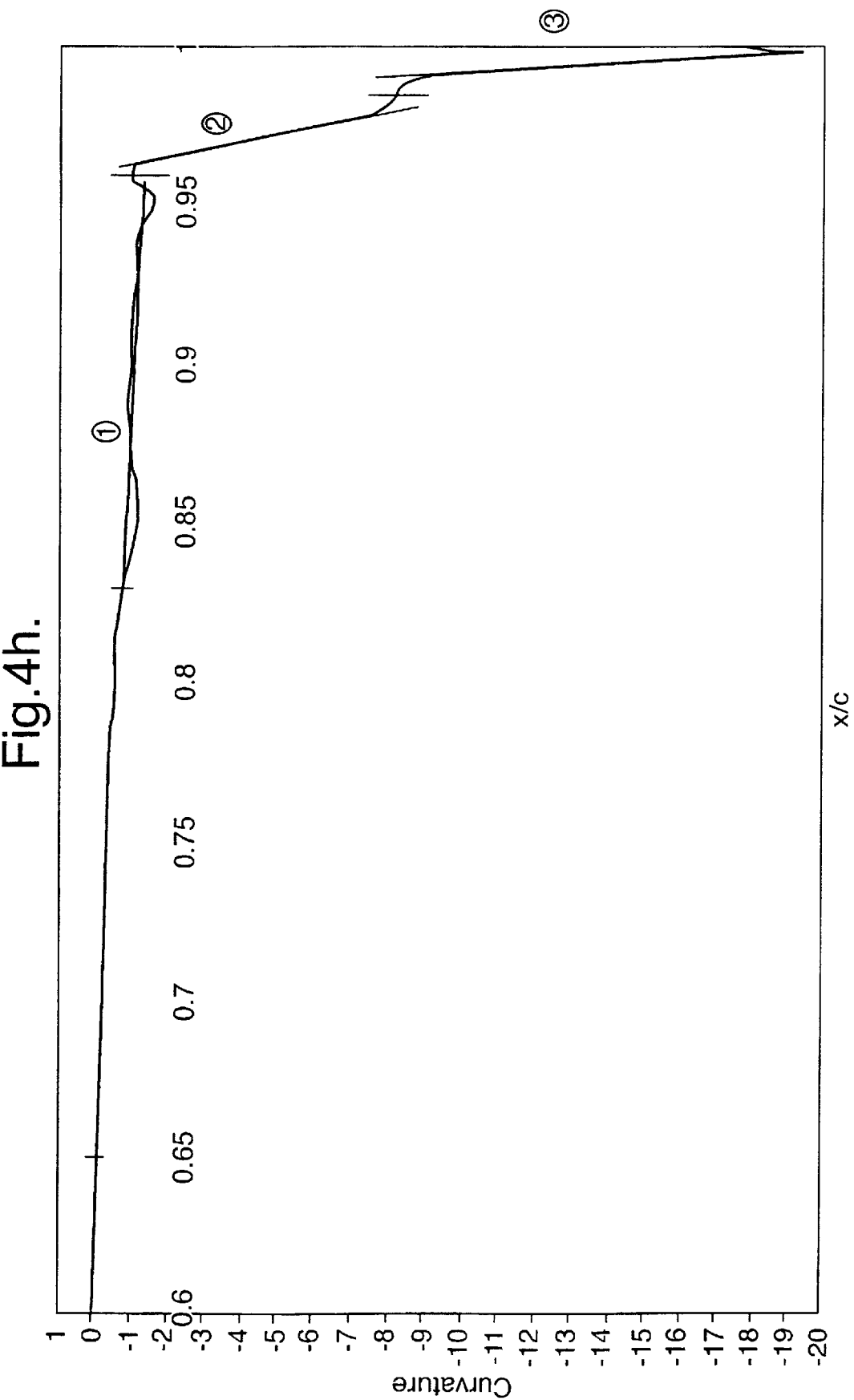
Figure 4I:
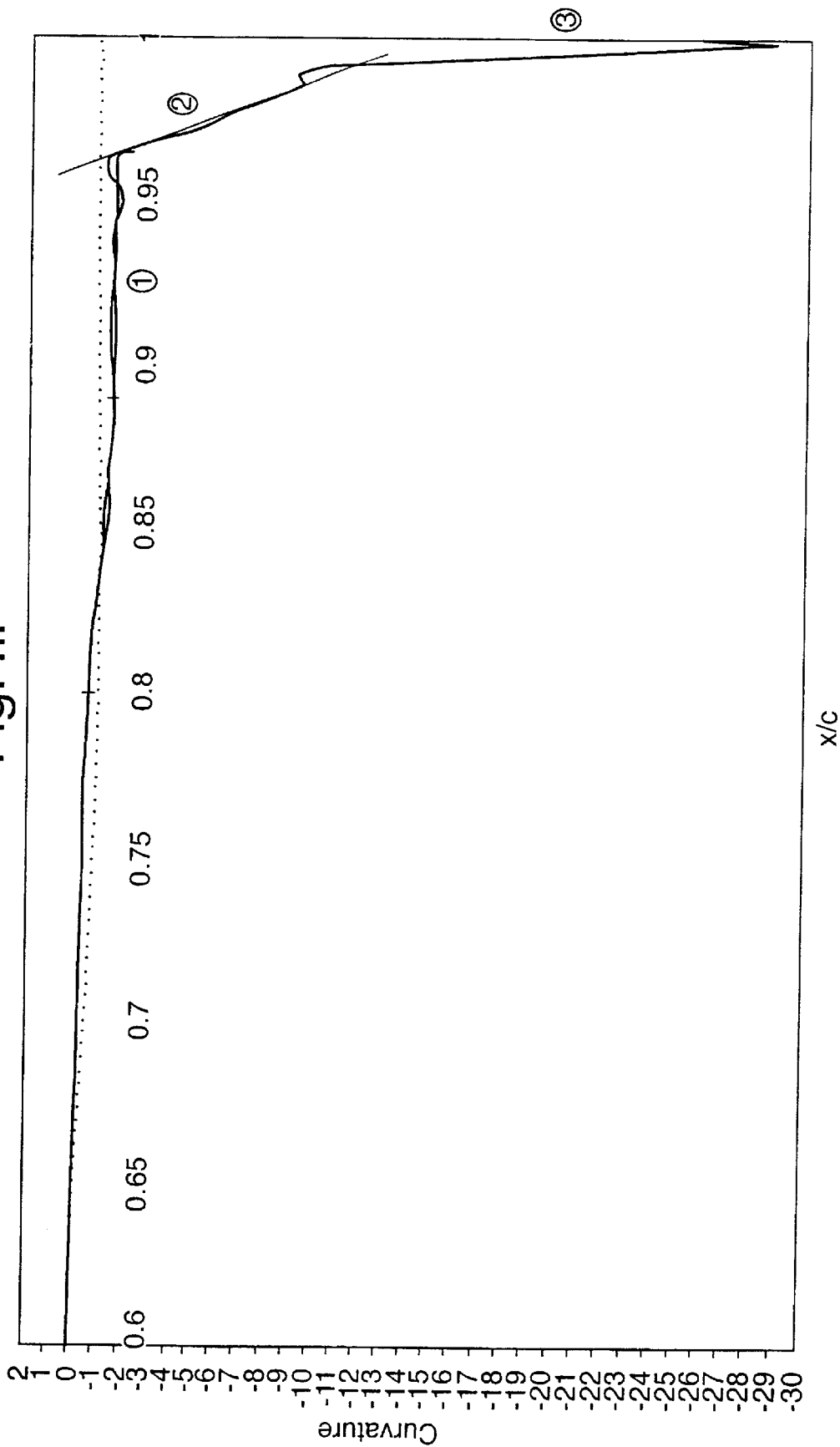

FIG. 3 compares the slope of camber of a known prior art aerofoil 5 and one according to the invention 6 having a reduced level of slope between 50% and 78% of chord followed by an increase in negative slope over the aft 3% of chord. The increase in negative slope at the trailing edge is of the order approaching three times the value at 97% chord of the prior art aerofoil. The negative camber of the novel section increases from −0.175 to about −0.50 at the trailing edge.

FIGS. 4a to 4j show the curvature against chord position for ten examples of aerofoils which fall within the scope of the invention.

FIG. 5 shows a generalised representation of these figures showing three distinct regions of linear negative increase in curvature in the rear half of the aerofoil chord. Thus each aerofoil according to the invention can be described as having three distinct slopes of monotonically linearly increasing negative changes in curvature. The first region 7 comprises generally a shallow linear increase in negative curvature as is shown from chord position a to b, the second region 8 a more steep linear increase in curvature from c to d and the third region 9 an even steeper increase in curvature from e to f.

The table below gives further information from the curvature characteristics of the aforementioned examples with particular reference to the three regions 7, 8, 9 of linear increase in curvature as described above. The table gives the magnitude of curvature of camberline at the start and finish of the first (a-b), second (c-d), and third (e to f) regions respectively, as well as the chord positions of the start and finish of these regions. The symbol λ denotes the [slope] change in curvature of the camberline [at the finish of each region multiplied by 100] per unit chord.

The table above shows for each aerofoil section the start and end points in terms of percentage chord of each region 7, 8, 9 as well as the curvature at these points. As can be seen the first region of linear increasing curvature extends over a large proportion of the camber line from generally 65% chord to approximately 95% chord. The increase in negative curvature is fairly shallow and the curvature increases over this region by an amount between 0.3 and 1.2. The second increase in negative curvature is generally over from the range 95 to 98% chord to 98 to 99% chord and is a sharper increase in the region of 3 to 20.5. The third increase in negative curvature takes place generally in the last 1% of chord from 99% chord and is a further increase ranging from 3 to 37.

Figure 6:
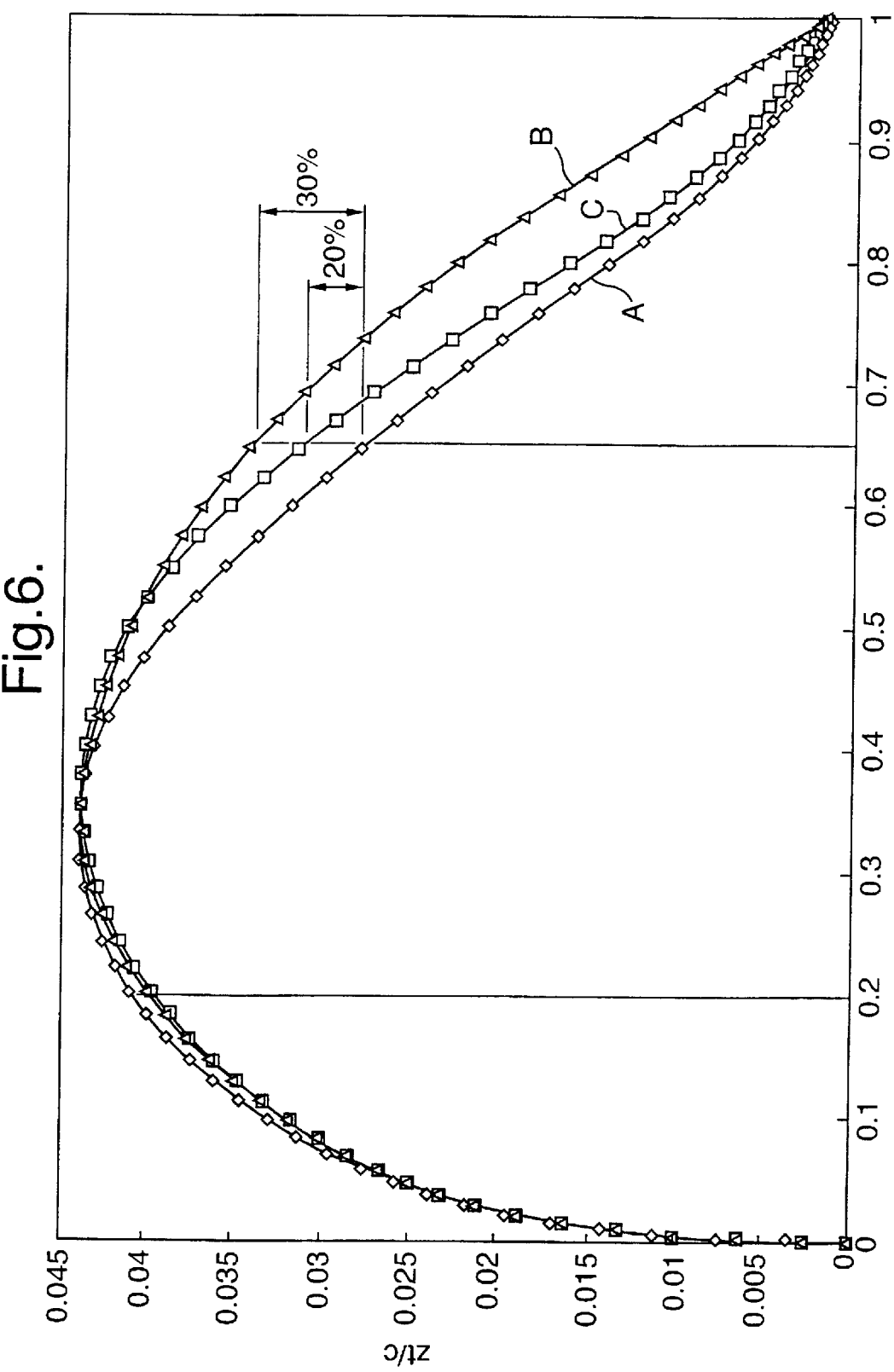
FIG. 6 compares the half thickness distribution for a conventional aerofoil and two airfoils embodying the invention.
Figure 7:
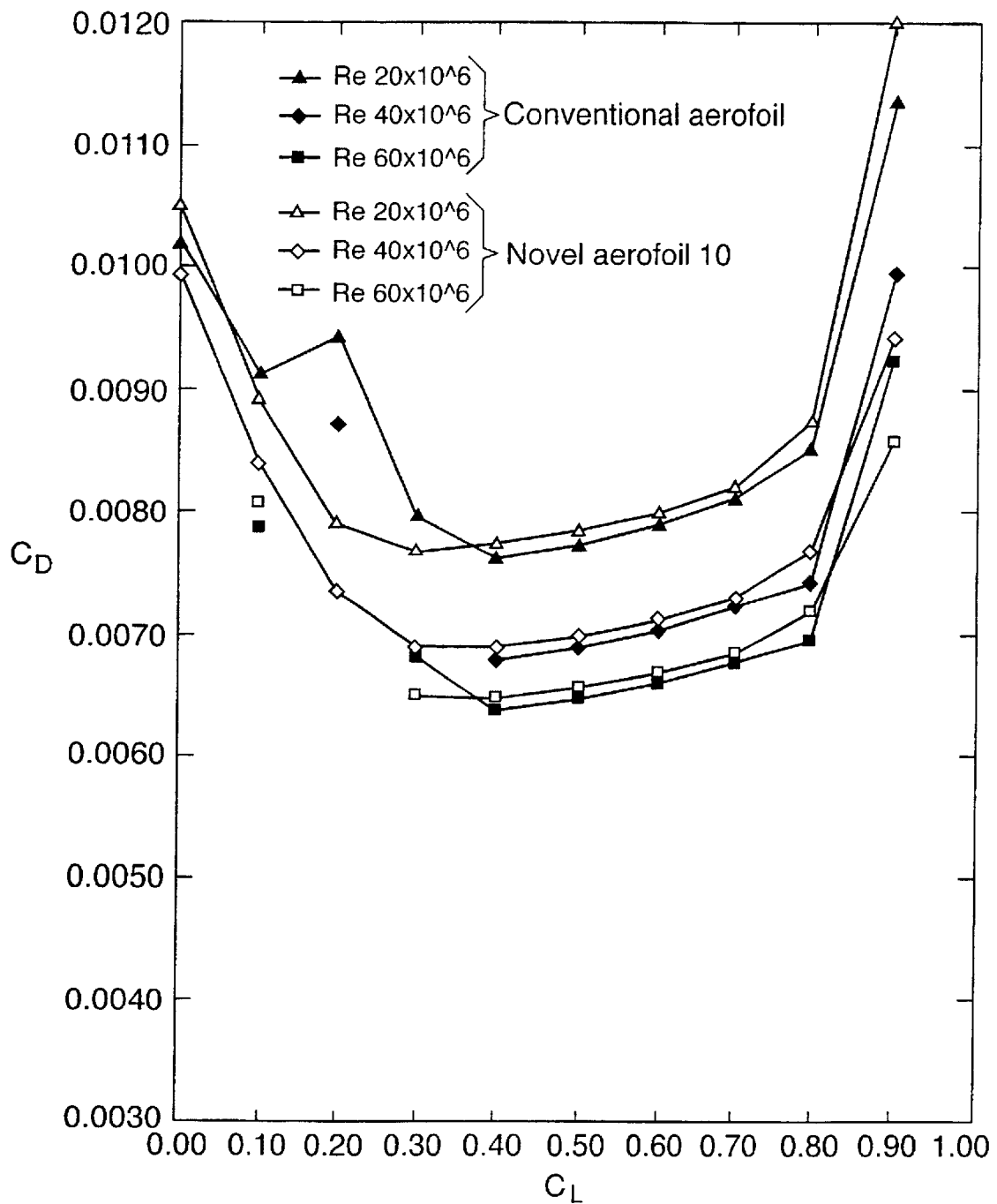
FIGS. 7, 8, 9, 10 each show graphs of drag coefficient against lift coefficient for two aerofoils according to the invention and in comparison with a conventional aerofoil for Mach numbers 0.74 and 0.77 respectively.
Figure 8:
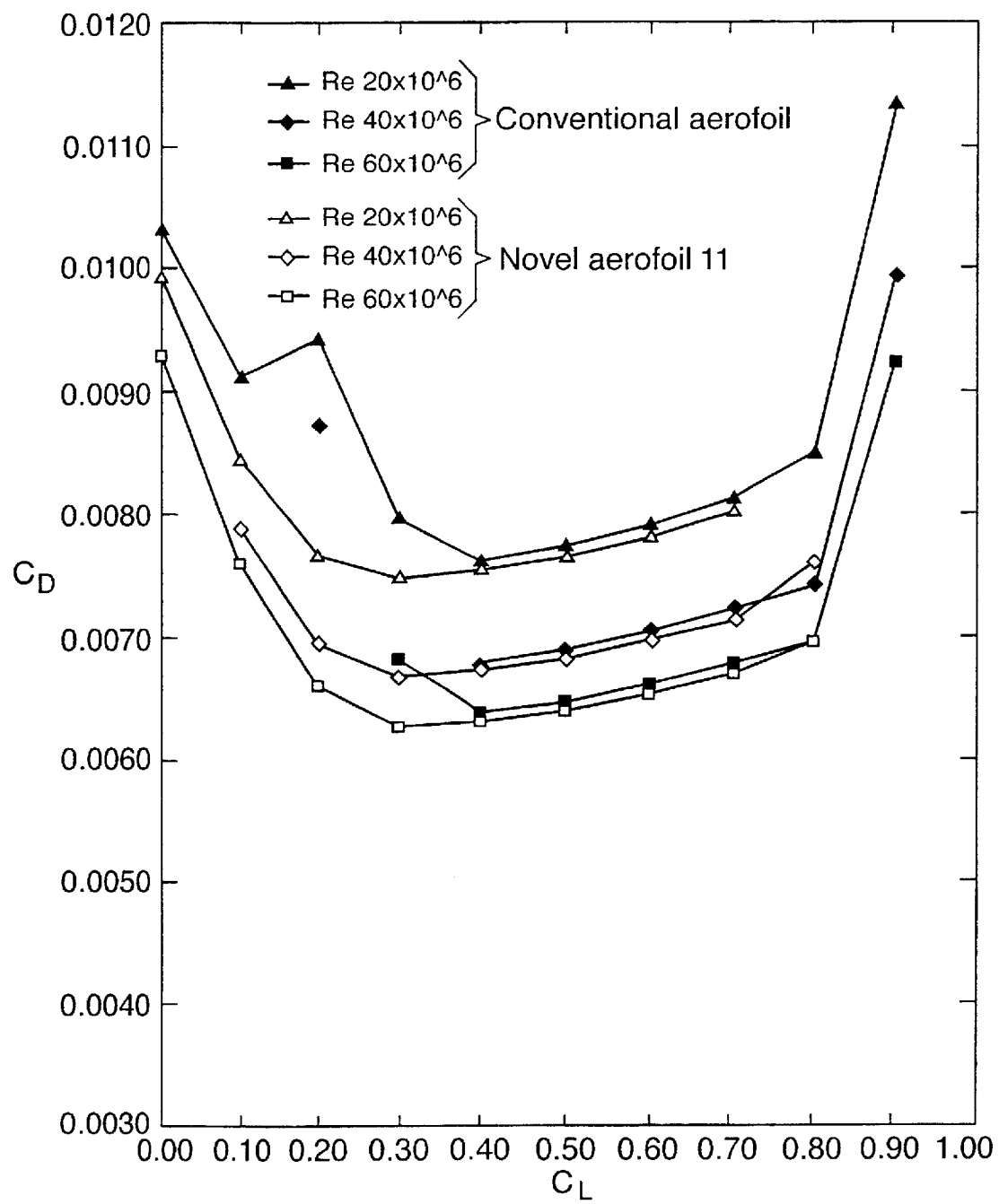
Figure 9:
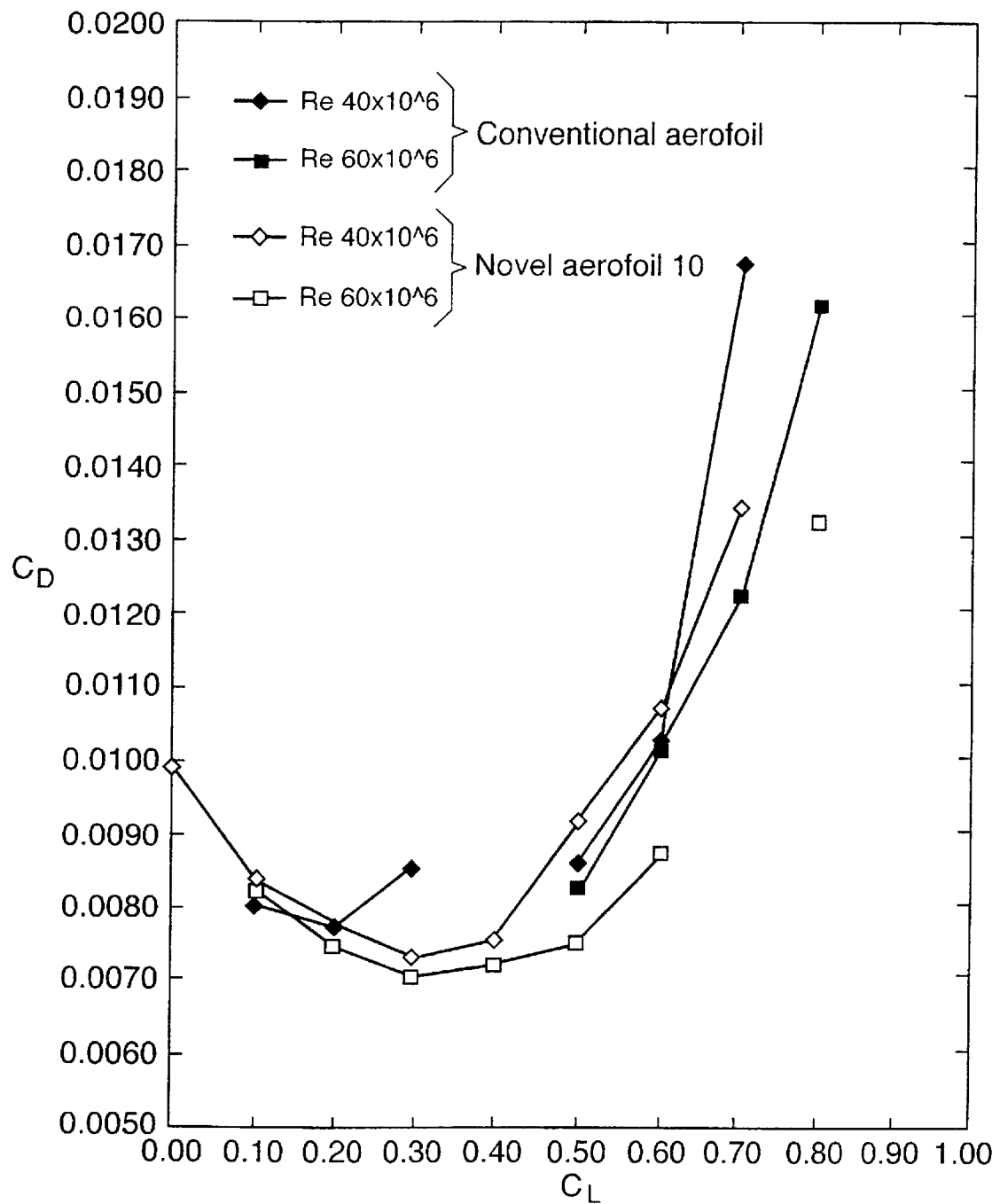
Figure 10:
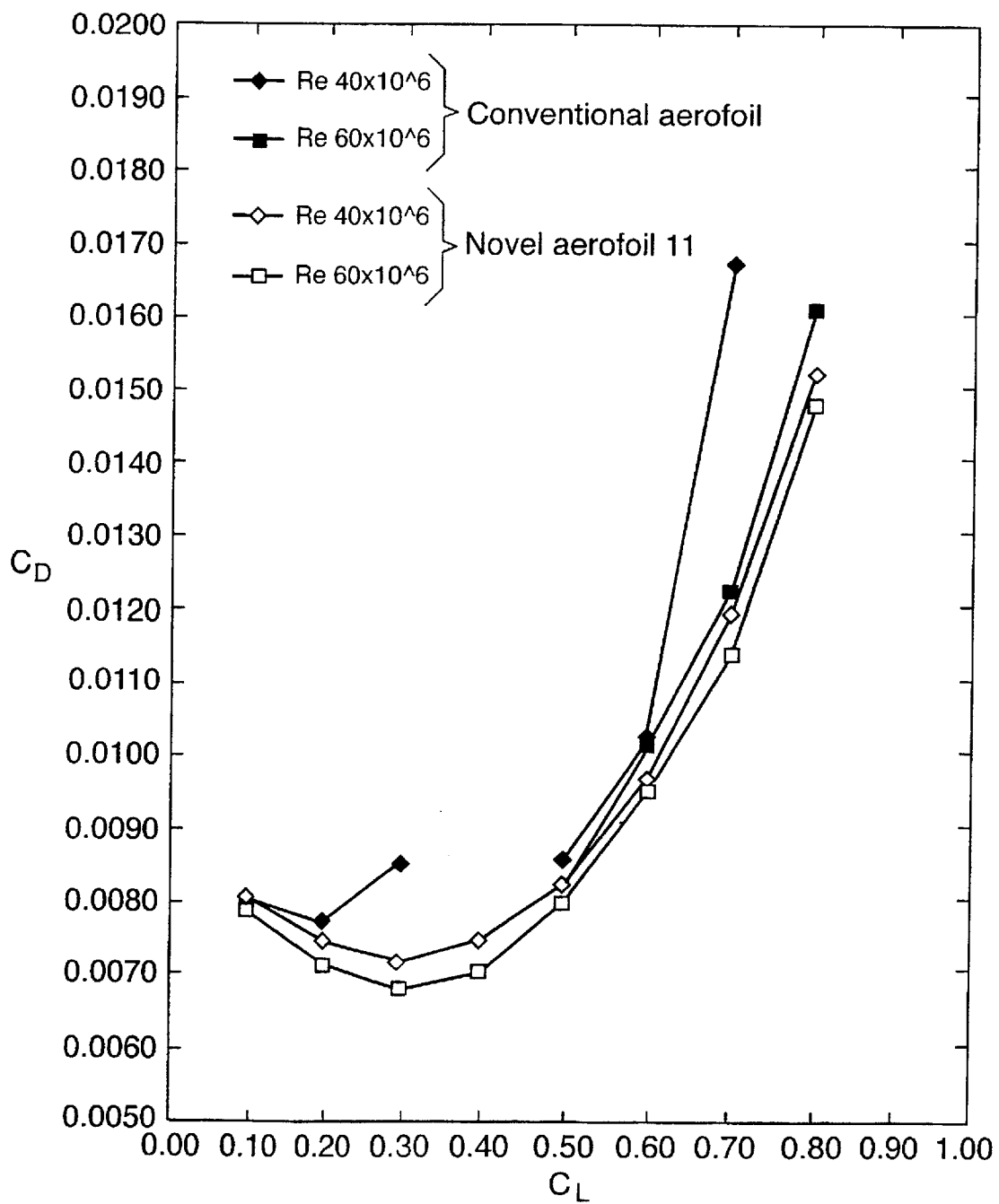

FIG. 6 compares the half thickness distribution zt/c, for a conventional aerofoil A and two aerofoils C and B according to the invention, where "c" is the section/wing chord and "t" is section/wing thickness. Aerofoil A has an upper surface pressure distribution with a conventional lower surface rear loading. Aerofoil B has a mild lower surface adverse pressure recovery with the local rear loading. The figures show that the aerofoils C and B have a significant increase in wing box volume, particularly between from 50% to about 95% of chord. The difference in wing box volume at 65% of chord are 20% and 30% larger for aerofoils C and B respectively compared to the conventional aerofoil. For aerofoil B the difference between the conventional aerofoil is even more pronounced at 80% of chord having a value of zt/c of about 0.024 and at 87% of chord this value is 0.017 compared with less than 0.01 for the conventional aerofoil; this is about 70% increase in wing box volume. The increase in rear depth offers better flap designs for low speed performance, lower structural weight and increased fuel volume. Therefore, a novel design based on aerofoil B can be exploited to trade lift for an increase in depth and maintain an acceptable aerodynamic performance.

FIGS. 7, 8, 9, 10 are graphs of drag coefficient against lift coefficient for two novel trailing-edge aerofoils 10, 11 respectively at Mach numbers 0.74 and 0.77 respectively. Both novel aerofoils are upper surface designs with differences in the start of the pressure recovery. The start of the pressure recovery is 70% chord for novel aerofoil 10 and 65% chord for novel aerofoil 11. Generally, the drag levels are similar to those for the conventional aerofoil, with the novel aerofoil 10 showing a slight drag penalty and novel aerofoil 11 a slight drag reduction at Mach 0.74. The design of novel aerofoil 10 gives a higher lift coefficient and has a lower drag at 0.9 $C_L$ for Reynolds numbers of 40×10⁶ and 60×10⁶. For Mach 0.77, both novel aerofoils show a benefit in terms of reduced drag relative to the conventional section.

FIG. 11 shows the improvement in drag rise boundary over a range of civil transport wings comparing novel aerofoil 10, novel aerofoil 11, and a conventional aerofoil. Novel aerofoil 11 has the same upper surface pressure distribution as novel aerofoil 10, but with a mild lower surface adverse pressure recovery with local rear loading close to the trailing edge. Novel aerofoil 11 has traded lift for an increase in thickness over the rear portion of the section. The results show a small drag penalty for novel aerofoil 11 relative to novel aerofoil 10.

| | Slope 1 | | | | | Slope 2 | | | | | Slope 3 | | | | |
|---|---|---|---|---|---|---|---|---|---|---|---|---|---|---|---|
| Aerofoil | x/c a | κ | x/c b | κ | λ/100 | x/c c | κ | x/c d | κ | λ/100 | x/c e | κ | x/c f | κ | λ/100 |
| a | 0.650 | −0.1 | 0.960 | −1.0 | −0.029 | 0.95 | −2.0 | 0.980 | −8.4 | −4.92 | 0.990 | −9.0 | 0.998 | −21.0 | −15.0 |
| b | 0.680 | −0.3 | 0.960 | −1.0 | −0.025 | 0.965 | −1.0 | 0.980 | −7.7 | −4.46 | 0.990 | −8.5 | 0.998 | −13.9 | −6.75 |
| c | 0.630 | −0.2 | 0.980 | −1.0 | −0.009 | 0.980 | −0.5 | 0.990 | −19.0 | −18.50 | 0.990 | −19.0 | 0.998 | −45.0 | −32.5 |
| d | 0.65 | −0.2 | 0.963 | −1.0 | −0.020 | 0.980 | −0.5 | 0.990 | −21.0 | −20.50 | 0.990 | −21.0 | 0.998 | −44.0 | −28.75 |
| e | 0.65 | 0.0 | 0.95 | −1.0 | −0.033 | 0.980 | −2.0 | 0.985 | −16.0 | −28.00 | 0.990 | −20.0 | 0.998 | −57.0 | −46.25 |
| f | 0.750 | −0.6 | 0.960 | −1.0 | −0.019 | 0.965 | −1.4 | 0.980 | −8.0 | −4.40 | 0.990 | −8.0 | 0.998 | −20.5 | −15.63 |
| g | 0.750 | −0.4 | 0.960 | −0.8 | −0.019 | 0.960 | −0.8 | 0.995 | −9.4 | −2.46 | 0.995 | −9.4 | 0.999 | −23.0 | −34.0 |
| h | 0.650 | −0.1 | 0.960 | −1.3 | −0.040 | 0.965 | −2.0 | 0.980 | −8.0 | −4.00 | 0.990 | −8.0 | 0.998 | −19.0 | −13.8 |
| i | 0.650 | −0.2 | 0.950 | −1.35 | −0.038 | 0.965 | −1.35 | 0.985 | −9.0 | −3.82 | 0.990 | −10.0 | 0.998 | −28.8 | −23.5 |
| j | 0.770 | −0.7 | 0.960 | −1.0 | −0.043 | 0.965 | −1.0 | 0.980 | −4.0 | −2.00 | 0.990 | −1.0 | 0.998 | −4.0 | −3.75 |

The invention covers an aerofoil comprising upper and lower surfaces meeting at the leading and trailing edges and having a chord line extending from said leading and trailing edges and a camber line representing the curvature of the aerofoil, wherein aft of 50% chord the camber line has three substantially linear increases in negative camber curvature. The examples given in the figures clarify this claim. In order to define the three regions of substantially linear increase in curvature it is necessary to make some definition.

These linear regions are defined as extending over either 20% of chord or covering a curvature increase of at least 3. It is therefore intended to exclude small increases in negative camber curvature which extend over a small portion of chord length. Additionally the term linear needs to be defined. The term linear for the first region is defined as wherein the maximum deviation in curvature from a straight line drawn along the region over at least 20% of chord is 1. The term linear for both the second and third regions is defined as wherein the maximum deviation in curvature is 1.5 from a straight line drawn along the region over at least an increase of +/−3.

The term linear for both the second and third regions is defined as wherein the maximum deviation in curvature is +/−1.5 from a straight line drawn along the region over at least an increase of [+/−]3.

What is claimed is:

1. A supercritical airfoil, said airfoil having upper and lower surfaces meeting at leading and trailing edges and a chord defined as the distance between said leading and trailing edges, said airfoil having a camber line representing the locus of points equidistant between the upper and lower surfaces along the chord, said airfoil camber line comprised of at least two regions as follows:

a first region, extending over at least 20% of said airfoil chord, in which said camber line is curved with said curvature increasingly curved at a first generally constant rate, where any deviation from a linear increase in curvature of said camber line along said first region is less than 1/chord; and a second region in which said camber line is curved with said curvature increasingly curved at a second generally constant rate greater than said first generally constant rate, said second region having a maximum curvature at least 3/chord greater than the maximum curvature of said first region, where any deviation from a linear increase in curvature of said camber line along said second region is less than 1.5/chord.

2. An aerofoil as claimed in claim 1 wherein there are three regions of substantially linear increases in curvature (7, 8, 9).

3. An aerofoil as claimed in claim 2, wherein the three regions of substantially linear increases in curvature are aft of 50% chord.

4. An aerofoil as claimed in claim 1 having a first substantially linear increase in curvature over the region of between 60 and 77% to between 96 to 98% chord.

5. An aerofoil as claimed in claim 4, wherein said first linear increase in curvature is between 0.2 and −1.4.

6. An aerofoil as claimed in claim 1 having a second substantially linear increase in curvature over the region of between 95.0 to 98.0% to between 98 to 99.5% chord.

7. An aerofoil as claimed in claim 6, wherein the second said linear increase in curvature is between −3 and −30.

8. An aerofoil as claimed in claim 1 having a third substantially linear increase in curvature over the region of between 99 to 99.5% to about 99.9% chord.

9. An aerofoil as claimed in claim 8, wherein the third linear increase in curvature is between −3 and −40.

* * * * *

UNITED STATES PATENT AND TRADEMARK OFFICE
CERTIFICATE OF CORRECTION

PATENT NO. : 6,651,927 B1
DATED : November 25, 2003
INVENTOR(S) : Hackett et al.

It is certified that error appears in the above-identified patent and that said Letters Patent is hereby corrected as shown below:

Column 2,
delete the paragraph at lines 23-24.

Column 3,
Line 37, delete "slope".

Column 4,
delete the paragraph at lines 58-67.

Column 5,
delete the sentence spanning lines 18-21.
Line 25, delete "[+/-]".

Signed and Sealed this

Sixth Day of April, 2004

JON W. DUDAS
*Acting Director of the United States Patent and Trademark Office*